(12) United States Patent
Ventelon et al.

(10) Patent No.: US 9,322,575 B2
(45) Date of Patent: Apr. 26, 2016

(54) SOLAR ENERGY REFLECTOR

(75) Inventors: Lionel Ventelon, Jumet (BE); Olivier Bouesnard, Jumet (BE); Bruno Cosijns, Jumet (BE)

(73) Assignee: AGC Glass Europe, Brussels (BE)

(*) Notice: Subject to any disclaimer, the term of this patent is extended or adjusted under 35 U.S.C. 154(b) by 1561 days.

(21) Appl. No.: 12/809,743

(22) PCT Filed: Dec. 19, 2008

(86) PCT No.: PCT/EP2008/067990
§ 371 (c)(1),
(2), (4) Date: Oct. 12, 2010

(87) PCT Pub. No.: WO2009/080741
PCT Pub. Date: Jul. 2, 2009

(65) Prior Publication Data
US 2011/0017202 A1     Jan. 27, 2011

(30) Foreign Application Priority Data
Dec. 21, 2007  (EP) ...................................... 07150319

(51) Int. Cl.
*F24J 2/10* (2006.01)
*F24J 2/16* (2006.01)
*G02B 5/08* (2006.01)
*C03C 17/36* (2006.01)

(52) U.S. Cl.
CPC *F24J 2/16* (2013.01); *F24J 2/1057* (2013.01); *G02B 5/0808* (2013.01); *Y02E 10/40* (2013.01)

(58) Field of Classification Search
CPC ......... F24J 2/10; F24J 2002/4683; F24J 2/16; F24J 2/1057; C03C 17/3644; C03C 17/06; G02B 5/0808; Y02E 10/40

USPC .................. 126/684, 696; 427/250, 295, 405
See application file for complete search history.

(56) References Cited

U.S. PATENT DOCUMENTS

| | | | | |
|---|---|---|---|---|
| 1,563,018 | A | * | 11/1925 | Colbert et al. ................. 428/433 |
| 1,942,686 | A | * | 1/1934 | Colbert .................. C03C 17/36 205/116 |
| 3,730,577 | A | * | 5/1973 | Shanok et al. ............. 292/251.5 |
| 4,108,540 | A | * | 8/1978 | Anderson et al. ............. 359/726 |

(Continued)

FOREIGN PATENT DOCUMENTS

| FR | 2 568 021 | | 1/1986 | |
|---|---|---|---|---|
| FR | 2898123 | A1 * | 9/2007 | .............. C03C 17/36 |

(Continued)

OTHER PUBLICATIONS

U.S. Appl. No. 12/988,099, filed Oct. 15, 2010, Ventelon, et al.

(Continued)

*Primary Examiner* — Gregory Huson
*Assistant Examiner* — Daniel E Namay
(74) *Attorney, Agent, or Firm* — Oblon, McClelland, Maier & Neustadt, L.L.P.

(57) ABSTRACT

A solar energy reflector (1) comprises a mirror (5) with no copper layer laminated to a supporting sheet (7) by means of a bonding material (6). The edges of the mirror (5) are provided, at least on a portion forming the major part of their height and closest to the metallic sheet, with an edge protection (8) made of a material comprising silicone, polyurethane and/or acrylic and the material forming the edge protection (8) is different from the bonding material (6).

15 Claims, 1 Drawing Sheet

(56) References Cited

U.S. PATENT DOCUMENTS

Figure 1:
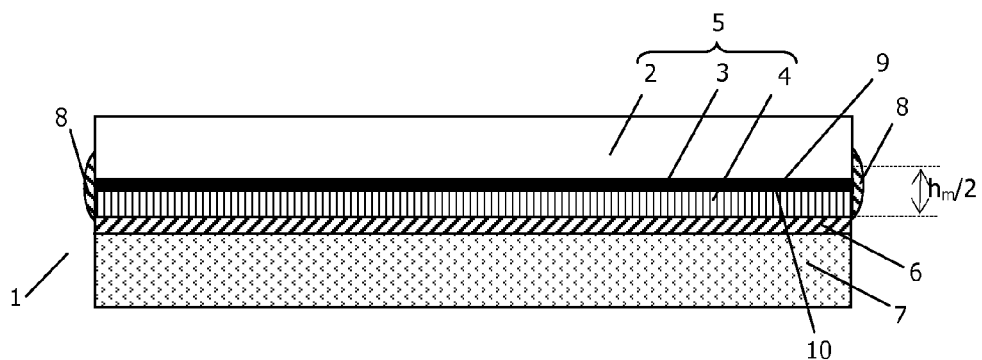

| | | | | |
|---|---|---|---|---|
| 4,296,732 A | * | 10/1981 | Bernhardt et al. | 126/624 |
| 4,326,500 A | * | 4/1982 | Bernhardt et al. | 126/625 |
| 4,343,533 A | * | 8/1982 | Currin et al. | 359/883 |
| 4,487,196 A | * | 12/1984 | Murphy | 126/690 |
| 4,511,618 A | * | 4/1985 | Duchene et al. | 428/215 |
| 4,547,432 A | * | 10/1985 | Pitts | C03C 17/06 216/62 |
| 4,906,084 A | * | 3/1990 | Christianson | 359/514 |
| 5,757,564 A | * | 5/1998 | Cross et al. | 359/870 |
| 6,896,970 B2 | * | 5/2005 | Mayzel | 428/458 |
| 6,955,833 B1 | * | 10/2005 | Gallego | C03C 17/36 427/167 |
| 7,012,729 B2 | * | 3/2006 | Tonazzi et al. | 359/265 |
| 7,329,845 B2 | * | 2/2008 | Kagawa | 219/619 |
| 7,612,937 B2 | * | 11/2009 | Jorgensen | F24J 2/1057 359/360 |
| 7,736,750 B2 | * | 6/2010 | Medwick | B32B 17/10036 428/141 |
| 7,807,248 B2 | * | 10/2010 | German | C03C 17/36 428/220 |
| 7,897,260 B2 | * | 3/2011 | Nunez-Regueiro | C03C 17/36 428/428 |
| 7,901,781 B2 | * | 3/2011 | Maschwitz | B32B 17/10036 428/212 |
| 7,951,473 B2 | * | 5/2011 | Maschwitz | C03C 17/36 427/160 |
| 2001/0000332 A1 | * | 4/2001 | Soltys | 428/434 |
| 2004/0223238 A1 | * | 11/2004 | Laroche et al. | 359/838 |
| 2004/0240029 A1 | * | 12/2004 | Tonazzi et al. | 359/265 |
| 2005/0018330 A1 | | 1/2005 | Sakoo et al. | |
| 2005/0030630 A1 | * | 2/2005 | Ohnishi et al. | 359/599 |
| 2005/0115952 A1 | * | 6/2005 | Kagawa | 219/535 |
| 2005/0202254 A1 | * | 9/2005 | Nunez-Regueiro | C03C 17/36 428/432 |
| 2005/0238886 A1 | * | 10/2005 | Gallego | C03C 17/36 428/428 |
| 2006/0172140 A1 | * | 8/2006 | Kuroda et al. | 428/447 |
| 2006/0181765 A1 | * | 8/2006 | Jorgensen et al. | 359/360 |
| 2007/0281169 A1 | * | 12/2007 | Pilloy | 428/429 |
| 2007/0291384 A1 | * | 12/2007 | Wang | 359/883 |
| 2008/0049317 A1 | * | 2/2008 | Hara et al. | 359/483 |
| 2008/0121225 A1 | * | 5/2008 | Kuckelkorn et al. | 126/635 |
| 2008/0138547 A1 | * | 6/2008 | Maschwitz | 428/34 |
| 2008/0145661 A1 | * | 6/2008 | Medwick et al. | 428/409 |
| 2008/0226819 A1 | * | 9/2008 | Kutilek et al. | C01G 23/053 427/250 |
| 2009/0047466 A1 | * | 2/2009 | German et al. | 428/98 |
| 2009/0136765 A1 | * | 5/2009 | Maschwitz et al. | 428/432 |
| 2009/0153988 A1 | | 6/2009 | Ventelon et al. | |
| 2011/0017202 A1 | * | 1/2011 | Ventelon et al. | 126/684 |

FOREIGN PATENT DOCUMENTS

| | | | | |
|---|---|---|---|---|
| GB | 2 042 761 | | 9/1980 | |
| GB | 2 112 300 | | 7/1983 | |
| JP | 56061536 A | * | 5/1981 | |
| JP | 62154246 A | * | 7/1987 | |
| JP | 05280807 A | * | 10/1993 | |
| WO | 2005 032312 | | 4/2005 | |
| WO | WO 2007144311 A1 | * | 12/2007 | C03C 17/3644 |
| WO | WO 2008059582 A1 | * | 5/2008 | C23C 14/0688 |
| WO | WO 2008104389 A2 | * | 9/2008 | B29D 11/00 |

OTHER PUBLICATIONS

International Search Report and Written Opinion issued Jan. 11, 2011, in PCT/EP2008067990.

* cited by examiner

SOLAR ENERGY REFLECTOR

CROSS REFERENCE TO RELATED APPLICATION

This application is a 371 of PCT/EP2008/067990, filed on Dec. 19, 2008, and claims priority to European Patent Application No. 07150319.7, filed on Dec. 21, 2007.

This invention relates to solar energy reflectors and to processes for their manufacture.

The reflectors of this invention may be used in solar energy or heating installations, for example concentrating solar power plants. Such installations use the solar energy to first generate heat, which later can be converted into electricity or used for steam production. Concentrating solar power plants wherein reflectors according to the present invention may be used comprise, for example, parabolic trough power plants, central tower power plants (also called heliostat power plants), dish collectors and Fresnel reflector power plants. Solar energy reflectors according to the present invention may be used in such installations as flat or curved mirrors.

Conventionally, solar energy reflectors have been produced by forming a laminate comprising a thin mirror bonded to a supporting sheet. Best reflectivity for the mirror may be obtained if it is thin, so that less solar energy is absorbed when passing through the glass substrate of the mirror. However thin mirrors may be poor in terms of mechanical resistance, therefore it is necessary to laminate them on a supporting substrate, for example a metallic sheet. Mirrors used for this type of application have generally been produced as conventional domestic mirrors used for interior applications, i.e. as follows: a sheet of flat glass (float, soda-lime glass) was first of all polished and then sensitised, typically using an aqueous solution of $SnCl_2$; after rinsing, the surface of the glass was usually activated by means of an ammoniacal silver nitrate treatment, and a silvering solution was then applied in order to form an opaque coating of silver; this silver coating was then covered with a protective layer of copper and then with one or more coats of leaded paint in order to produce the finished mirror. The combination of the protective copper layer and the leaded paint was deemed necessary to provide acceptable ageing characteristics and sufficient corrosion resistance. Solar energy reflectors manufactured with conventional mirrors comprising a layer of copper are for example described in GB 2 042 761 A.

More recently, mirrors were developed which dispensed with the need for the conventional copper layer, which could use substantially lead-free paints and yet which still had acceptable or even improved ageing characteristics and corrosion resistance. For example, U.S. Pat. No. 6,565,217 describes embodiments of a mirror with no copper layer which comprises in the order recited: a vitreous substrate; both tin and palladium provided at a surface of the vitreous substrate; a silver coating layer on said surface of the substrate; tin present at the surface of the silver coating layer which is adjacent to an at least one paint layer; and at least one paint layer covering the silver coating layer. Such mirrors provided a significant advance with respect to conventional coppered mirrors.

Solar energy reflectors comprising conventional coppered mirrors, as described in GB 2 042 761 A for example, may show good ageing properties and good corrosion resistance. However corrosion, in particular edge corrosion, of the mirrors may be responsible for a loss in the total reflective surface of a concentrating solar power plant with time, giving rise to a loss in the yield of the plant. Therefore, it may be necessary to replace from time to time the solar energy reflectors of the plant with new ones, which is time-consuming and expensive. There is thus a need for solar energy reflectors with increased lifetime, in particular with better corrosion resistance, especially edge corrosion resistance.

Solar energy reflectors incorporating new generation mirrors with no copper layer may provide good corrosion resistance, often better than when incorporating conventional coppered mirrors. However we have found that it may still be possible to improve their corrosion resistance, in particular their edge corrosion resistance.

Whilst it is quite clear that providing the edges of the mirror with an edge protection might increase the corrosion resistance of a solar energy reflector, we surprisingly found that using materials with very low permeability to water vapour for the edge protection, for example butyl-based or hot-melt adhesives, did not necessarily give the best results in terms of corrosion resistance for the finished solar energy reflector.

According to one of its aspects, the present invention provides a solar energy reflector as defined by claim 1. Other claims define preferred and/or alternative aspects of the invention.

The invention provides a new solar energy reflector structure. In addition, this structure provides an improved resistance to ageing and/or corrosion than conventional solar energy reflectors incorporating mirrors with a copper layer.

Solar energy reflectors according to the invention comprise a mirror with no copper layer laminated to a supporting sheet by means of a bonding material. By "mirror with no copper layer", we mean herein an article comprising a transparent substrate (e.g. glass or plastic) coated with a layer of silver and at least one layer of paint and which does not comprise a layer of copper between the silver and paint layers. Preferably, the mirror comprises a glass substrate, a silver coating layer provided at a surface of the glass substrate and at least one paint layer covering the silver coating layer, and the mirror is laminated to the supporting sheet so that the at least one paint layer is facing the supporting sheet. The silver coating layer provides the reflective layer of the mirror (which reflects the sun rays that pass through the glass sheet). The at least one paint layer may provide a protection for the silver layer from possible chemical attacks by the bonding material, and a surface to which the bonding material can adhere.

Solar energy reflectors according to the invention comprise an edge protection provided on the edges of the mirror, on at least a portion forming the major part of their height and closest to the supporting sheet; this means that more than the half-thickness portion of the mirror closest to the supporting sheet is covered with the edge protection. This may be advantageous in that the exposed edges of the silver layer are completely surrounded by the edge protection. In a preferred embodiment, substantially the whole thickness of the mirror edges is provided with the edge protection. This may provide a greater covering of the edges which may be even more efficient and which may be easier to apply.

The edge protection according to the invention is made of a material comprising at least one of silicone, polyurethane or acrylic, and preferably consisting essentially of at least one of these compounds. We have surprisingly found that simply selecting a material with a low water vapour permeability for the material forming the edge protection is insufficient to provide the desired degree of corrosion resistance. The ingress of moisture or water between the layers of the mirrors may be a significant cause of edge corrosion. Nevertheless, selecting materials with very low water vapour permeability for the edge protection (for example butyl-based or hot melt adhesives having permeability values of the order of 0.1 g/m²/

24 h for a 2 mm thick membrane) did not prove to inevitably give good results in terms of edge corrosion resistance for the solar energy reflectors. It is now believed that the ability of the edge sealing material to form an unbroken seal to the mirror and/or solar energy reflector is also of critical importance for providing the desired degree of edge protection. The unexpectedly poor protection provided with butyl-based or hot-melt adhesives may be explained by the difficulty of forming a regular and controlled (in terms of geometry) edge protection with such pre-extruded materials, their viscosity not being adapted to form an edge protection adjusted to the edges of the mirror, i.e. not being adapted to form an edge protection without gaps between the edges of the mirror and the edge protection. We found that the best results were obtained with materials which, in addition to possessing at least a reasonably low water vapour permeability, provide the ability to form a regular and controlled edge protection, particularly by having appropriate viscosity at the time the edge protection is applied, and have adequate adhesion to the mirror and/or supporting sheet. Polyurethanes, acrylics and silicones may offer such properties. Butyl-based adhesives, if they are hot-melt and applied hot or if they contain a solvent, may also offer such properties. Silicone sealant, for example, offers a water vapour permeability of around 20 to 25 g/m$^2$/24 h, is pasty and may be applied in a controlled way, for example with a paddle, and has a good adhesion. Silicones according to the present invention may be MS polymers.

It was previously proposed (in GB 2 042 761 A) to create an edge protection for solar energy reflectors by causing an excess quantity of bonding material to exude out around the periphery of the mirror as a sealant bead, but we have found that such method could not provide a regular and controlled edge protection in order to ensure an improved edge corrosion resistance to solar energy reflectors incorporating a mirror with no copper layer. According to the present invention the material forming the edge protection is different from the bonding material. This may ensure that the best properties are selected for the bonding material in relation to that particular application, whilst the best properties are selected for the edge protection material in relation to that specific application. Edge protection formed by the exuding out of bonding material is not encompassed by the present invention.

Preferably, the edge protection according to the present invention does not decrease the reflecting surface of the solar energy reflector. This means that preferably, the edge protection does not cover the borders of the front surface of the reflector.

The bonding material may comprise any known adhesive adapted for this type of laminated product, however we found advantageous for the bonding material to comprise, or preferably consist essentially of, an acrylic resin. Epoxy, silicone and polyurethane resins, in certain circumstances, may release chemical species which may attack the paint of the mirror and finally corrode the silver layer; epoxy resins may exert traction on the paint and silver layers of the mirror when cross-linking takes place, which may cause detachments to occur in the mirror structure; hot-melt adhesives may lose at least part of their elasticity when being exposed to higher temperatures, which may cause the mirror to detach from the supporting sheet; silicone may be too rigid when the metallic sheet dilates when subjected to differences in operating temperatures, which may cause the paint and silver layers of the mirror to be pulled out; silicone may create planarity defects during lamination; polyurethane resins may not be sufficiently resistant to UV rays. Acrylic resins may show advantageous properties in terms of chemical neutrality, resistance to UV rays, and flexibility and elasticity. The bonding material may alternatively comprise, or preferably consist essentially of, EVA (ethylvinylacetate) or other acetate-based polymer film, PVB (polyvinylbutyral), TPU (thermoplastic urethane) or ionomer-based films. They may also show advantageous properties in terms of chemical neutrality, resistance to UV rays, and flexibility and elasticity.

In preferred embodiments, the bonding material comprises or consists essentially of an acrylic pressure-sensitive adhesive. It may be provided as a transfer tape wherein the adhesive is present between two supporting release sheets which are intended to be removed. Such adhesive may have a thickness of around 60 µm. Alternatively, it may be provided as a supported tape wherein the adhesive is provided on both side of a supporting sheet which is intended to stay. Such a supported tape may, for example, comprise a core which consists essentially of a PET film, for example of 12 µm thick, surrounded by layers consisting essentially of the acrylic pressure-sensitive resin, each layer having a thickness of, for example, around 32 µm.

The supporting sheet may be metallic or made of glass or plastic. It may be made of glass reinforced plastic or of a thermosetting material. Preferably, it is made of steel, stainless steel, galvanised steel, painted steel, or aluminium.

Advantageously, the supporting sheet may be slightly greater in size than the mirror, and the mirror may be bonded to the supporting sheet such that projecting margins may extend and may help in supporting the edge protection.

Preferably, the thickness of the supporting sheet, when it is metallic, may be greater than 0.5 mm or 0.6 mm and less than 1 mm or 0.9 mm; it may preferably be around 0.7 or 0.8 mm.

Advantageously, the total thickness of the mirror may be greater than 0.9 mm or 1.1 mm; it may be less than 2 mm or 1.5 mm; it may preferably be around 0.95 or 1.25 mm. Such thin and flexible mirrors may be used in applications were curved reflectors are needed. When flat reflectors are used, the total thickness of the mirror may be greater than 2 mm or 2.5 mm; it may be less than 6 mm or 5 mm.

Preferably, the silver coating layer of the mirror has a thickness of at least 80 nm, at least 100 nm, more preferably at least 120 nm, or at least 140 nm; its thickness may be less than 200 nm, preferably less than 180 nm. These values offer a good compromise between a good energetic reflectance value for the reflector and an acceptable cost of production. Preferably, the glass substrate of the mirror is made of extra-clear glass, i.e. a glass with a total iron content expressed as $Fe_2O_3$ of less than 0.02% by weight. This also may favour a good energetic reflectance value for the reflector.

In one preferred embodiment of mirrors for solar energy reflectors according to the invention, the paint layer or at least one of the paint layers applied over the silver layer is lead-free or substantially lead-free. This is advantageous in that lead is toxic and its avoidance has environmental benefits. Substantially lead-free means herein that the proportion of lead in the paint is significantly less than the proportion of lead in leaded paints conventionally used for mirrors. The proportion of lead in a substantially lead-free paint layer as herein defined is less than 500 mg/m$^2$, preferably less than 400 mg/m$^2$, more preferably less than 300 mg/m$^2$. The proportion of lead in a lead-free paint layer as herein defined is less than 100 mg/m$^2$, preferably less than 80 mg/m$^2$, more preferably less than 60 mg/m$^2$.

Resistance to ageing and/or corrosion of solar energy reflectors may be defined with reference to the CASS test, i.e. copper-accelerated acetic acid salt spray test. In that test the reflector is placed in a testing chamber at 50° C. and is subjected to the action of a fog formed by spraying an aqueous solution containing 50 g/l sodium chloride, 0.26 g/l anhydrous cuprous chloride with sufficient glacial acetic acid to bring the pH of the sprayed solution to between 3.1 and 3.3. Full details of this test are set out in International Standard ISO 9227-1990. Reflectors may be subjected to the action of the saline fog for different lengths of time, whereafter the reflective properties of the artificially aged solar energy reflector may be compared with the reflective properties of the freshly formed solar energy reflector. An exposure time of 15 days may give a useful indication of the resistance of a solar energy reflector to ageing. The CASS test is performed on 10 cm square reflector tiles, and after exposure to the copper-accelerated acetic acid salt spray for 5, 10, 15, 20 or more days, each tile is subjected to microscopic examination. The principal visible evidence of corrosion is a darkening of the silver layer of the mirror around its margins. The extent of corrosion is noted at five regularly spaced sites on each of two opposed edges of the tile and the mean average of these ten measurements is calculated. One can also measure the maximum corrosion present at the margin of the tile to obtain a result which is again measured in micrometers. Preferably, the maximum corrosion after 15 days is less than 200 µm or less than 150 µm, more preferably less than 120 µm or less than 100 µm, and the average corrosion after 15 days is less than 120 µm, less than 100 µm, more preferably less than 80 µm or less than 50 µm. For a more representative evaluation, the CASS test may be performed on ten samples of a solar energy reflector and the mean average of the ten samples calculated from the mean average of each sample.

Another indication of ageing of solar energy reflectors is the apparition of haze after a thermal cycling test. In that test the reflector is placed in a testing chamber with a relative degree of humidity of 100% measured at 75° C. and is subjected, 4 times per day, to a cycle of temperature change between −20° C. and 75° C. Preferably, solar energy reflectors according to the present invention may show no haze or an acceptable haze after a 126 days-test and adhesion between the mirror and the supporting sheet is good.

In methods of manufacturing mirrors for solar energy reflectors according to certain aspects of the invention, sensitising, activating and passivating steps may contribute to the ageing and/or corrosion resistance of the mirrors and/or to their durability. Preferably, the solutions brought into contact with the glass substrate during the successive manufacturing steps are sprayed onto the glass substrate with optional intervening rinsing and/or washing steps. For example, during the industrial manufacture of flat mirrors, sheets of glass may pass through successive stations where sensitisation, activation, silvering and passivating reagents are sprayed. In practice, on a mirror production line, the sheets of glass are generally conveyed along a path by a roller conveyor. They are first of all polished and rinsed prior to being sensitised by means for example of a tin chloride solution sprayed on the glass; they are then rinsed again. An activating solution is then sprayed onto the sheets of glass; this activating solution may be for example, an acidic aqueous solution of $PdCl_2$. The sheets of glass then pass to a rinsing station where demineralised water is sprayed, and then to the silvering station where a traditional silvering solution is sprayed, the silvering solution being combined upon application to the glass from two separately sprayed solutions, one solution comprising a silver salt and either a reducing agent or a base and the other solution comprising whichever component (a reducing agent or a base) which is absent from the solution containing the silver salt. The flow rate and concentration of the silvering solution sprayed onto the glass are controlled so as to form a layer of silver of a desired thickness, for example containing between 800 and 2000 mg/m² of silver, preferably in the range 1400-1800 mg/m² of silver. The glass is then rinsed and directly after the rinsing of the silver coating, an aqueous solution of for example $SnCl_2$ is sprayed onto the silvered glass sheets as they move forward along the conveyor. After a further rinsing, the mirrors may then be treated by spraying with a solution containing a silane. After rinsing and drying, the mirrors are covered with one or more paint layers. The paint is then cured or dried, for example in a tunnel oven. Preferably, the paint is applied onto the silvered substrates in the form of a continuous curtain of liquid paint falling onto the glass sheets in a curtain coating process.

Solar energy reflectors according to the invention may be manufactured by gluing together a mirror and a supporting sheet by means of a bonding material, and applying an edge protection on the edges of the mirror, for example using a paddle or an extruding gun, and allowing the bonding and/or edge protection materials to dry, cure or cool. The mirror may have been edge-worked (e.g. grinded, bevelled or chamfered) before being glued to the supporting sheet.

According to another of its aspects, the present invention provides a method for manufacturing a solar energy reflector as defined by claim 12.

Preferably, the viscosity of the bonding material, at the time it is applied on the edges of the mirror, is characterised by at least one of the following values:
  i. extrusion rate greater than or equal to 50, preferably 100 g/min when measured according to method A as herein defined
  ii. extrusion rate greater than or equal to 5, preferably 10 g/min when measured according to method B as herein defined
  iii. viscosity less than or equal to 800, preferably 700 Pa·s when measured according to method C as herein defined
  iv. melt flow index greater than or equal to 30, preferably 50 ml/10 min when measured according to method D as herein defined
  v. extrusion rate greater than or equal to 60, preferably 180 g/min when measured according to method E as herein defined.

Since various methods may be used for measuring viscosity, according to the nature of the material to be analysed, various corresponding viscosity limit values are given herein.

Method A may be used for example for measuring the viscosity of two-components silicone materials. The extrusion rate is measured after mixing the 2 components for 3 to 4 minutes, then pouring them in a cartridge with a circular opening of 5.6 mm diameter and pressing at 20° C. with 6.2 kg/cm². The material is extruded for 10 s and the rate is calculated in g/minute.

Method B may be used for example for measuring the viscosity of PU materials. The extrusion rate of mixed materials may be quantified by measuring the amount of sealant that goes through a Ford cup equipment (opening 2 mm-length 14 mm) under 2.75 bars at 23° C. and 50% RH. The value is given in g/min.

Method C may be used for example for measuring the viscosity of PU materials. Viscosity can directly be measured with a Brookfield equipment using a TD spindle and Helipath system. A vessel is filled with material and the rotating spindle is immersed in it. The resistance to the rotation of the spindle is evaluated and gives the viscosity. Values herein given are measured at 10 rpm and 23° C. and expressed in Pa·s.

Method D may be used for example for measuring the viscosity of hot-melt and butyl materials. A melt flow index or melt volume index (ASTM D1238) is measured as follows: the material is heated to its application temperature in a heating chamber, then it is pressed with suitable weight (depending on its resistance to flow). Material then flows through an opening of around 2 mm diameter and volume extruded is measured during 10 minutes. For butyl, for example, melt volume index may be higher than 50 ml/10 min (at 130° C. with 10 kg).

Method E may be used for example for measuring the viscosity of butyl materials comprising solvents. The extrusion rate is measured through a SEMCO 440 hole type equipment at 3 bars, 20° C. Measured value is given in g/min.

The finished reflector may have an energetic reflectance according to standard ISO 9050:2003 of greater than 90%, preferably greater than 92%. The energetic reflectance may be less than 96% or less than 95%.

Embodiments of the invention will now be further described, by way of example only, with reference to FIGS. 1 to 5 and to examples 1 to 3, along with comparative examples 1 to 6.

Figure 3:
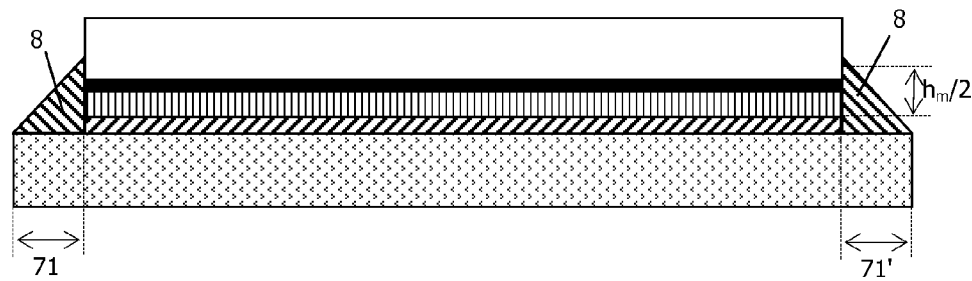
Figure 4:
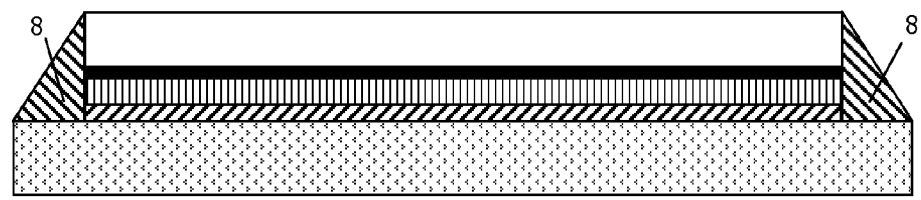
Figure 5:
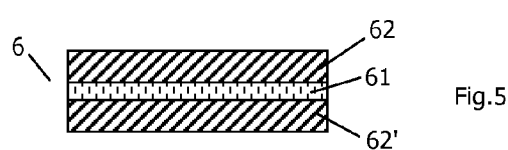

FIGS. 1 to 4 are schematic cross-sections of solar energy reflectors according to the invention. FIG. 5 is a schematic side view of a particular embodiment of the bonding material. Figures are not drawn to scale. Identical texturing is used for identical elements in the various figures.

FIGS. 1 to 4 show solar energy reflectors (1) which comprise a mirror (5) laminated to a metallic sheet (7) by means of a bonding material (6). The edges of the mirror (5) are provided, at least against the glass/silver (9) and silver/paint (10) interfaces, with an edge protection (8). In these figures, the edges of the mirror (5) are provided, at least on a portion forming the major part of their height and closest to the metallic sheet, with an edge protection (8); this means that more than the half-height portion of the mirror closest to the metallic sheet ($h_m/2$=half-height of the mirror) is covered with the edge protection. The material forming the edge protection (8) is different from the bonding material (6). The mirror comprises a glass substrate (2), a silver layer (3) and at least one paint layer (4); it does not comprise a copper layer. Surface 9 represents the glass/silver interface; surface 10 represents the silver/paint interface.

Figure 2:
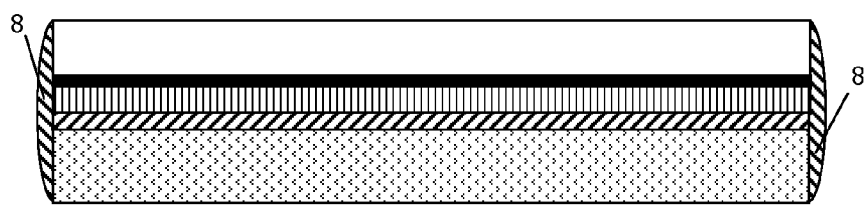

In FIGS. 1 and 3, the edge protection is sufficient to ensure that more than the half-thickness of the mirror closest to the metallic sheet is covered with the edge protection, in particular that the silver layer (3) of the mirror is completely surrounded by the edge protection. In FIGS. 2 and 4, the edges of the mirror (5) are provided substantially on their total height with the edge protection (8).

FIGS. 3 and 4 relate to embodiments wherein the metallic sheet (7) is greater in size than the mirror (5) creating projecting metallic margins (71, 71') which help in supporting the edge protection (8).

FIG. 5 shows an acrylic supported tape comprising a core (61) which is a PET film, surrounded by layers (62, 62') of an acrylic pressure-sensitive adhesive. The PET film is for example 12 µm thick and each layer of the acrylic adhesive is, for example, around 32 µm thick.

Examples 1, 2 and 3 are solar energy reflectors according to the present invention. They comprise a mirror of the type MNGE®, a mirror with no copper layer commercialised by AGC Flat Glass Europe SA and a metallic sheet bonded together by means of an acrylic bonding material. In example 1, the mirror is 4 mm thick, the metallic sheet is an aluminium sheet and the bonding material is a transfer tape of around 60 µm thickness; in example 2, the mirror is 1.25 mm thick, the metallic sheet is a painted galvanised steel sheet and the bonding material is a supported tape with a core layer of PET of 12 µm thickness surrounded by around 32 µm-thick layers of acrylic resin; in example 3, the mirror is 4 mm-thick, the metallic sheet is an aluminium sheet and the bonding material is a transfer tape of around 60 µm thickness. The metallic sheets are 1 mm thick. In examples 1 and 2, a controlled edge protection of silicone DC3362 commercialised by Dow Corning is provided on the edges of the mirror; in example 3, a controlled edge protection of polyurethane JS442 from the company Tremco Prosytec is provided on the edges of the mirror. The geometry of the reflectors, in particular the geometry of the edge protection, according to examples 1, 2 and 3 corresponds to FIG. 4, with projecting metallic margins of around 5 mm.

Comparative example 1 is a mirror of the type MNGE®, which is not laminated to a metallic sheet and which does not comprise any edge protection.

Comparative examples 2 to 6 are all solar energy reflectors not in accordance with the present invention. They comprise, like example 1 and 2, a mirror of the type MNGE® and a metallic sheet. In comparative examples 2, 5 and 6 the mirror is 1.25 mm thick, in comparative examples 3 and 4, it is 4 mm thick. In comparative examples 2 and 5, galvanised steel is used for the metallic sheet, in comparative examples 3, 4 and 6, aluminium is used for the metallic sheet.

In comparative examples 2 to 4, the mirror is bonded to the metallic sheet by means of an acrylic transfer tape as used in examples 1 or 3 and various types of material are used for the edge protection: in comparative example 2, no edge protection is provided; in comparative example 3, Butyl JS680 from the company Tremco Prosytec is used; and in comparative example 4, hot melt NOVATHERM 415 from the company LJF is used. In comparative examples 3 and 4, the geometry of the reflectors is the same as in the examples.

Comparative examples 5 and 6 correspond to embodiments (not in accordance with the invention) where the material of the edge protection is the same as the material used for the bonding: the edge protection is formed by the exuding out of bonding material. In comparative example 5, an acrylic transfer tape as in example 1 was cut to dimensions slightly greater than the mirror and first stuck to the mirror. The projecting borders of the acrylic layer were then turn over to cover the whole height of the mirror edges. Then finally, the mirror was bonded to the metallic sheet. In comparative example 6, an acrylic transfer tape as in example 1 is first stuck to the metallic sheet, then the mirror is pressed against the metallic sheet so that a little of bonding material exits from the space between the mirror and the metallic sheet, thereby forming an uncontrolled bead of bonding material as edge protection. In comparative example 6, the metallic sheet did comprise projecting metallic margins.

Examples 1 to 3 and comparative examples 1 to 6 were subjected to a CASS test as hereinabove described during various periods. Results of these tests are presented in Table I. Results of average and edge corrosions are given in µm.

It can be seen that the combination of acrylic as bonding material and silicone or polyurethane as edge protection gave very good results in terms of corrosion resistance, compared to a standard mirror with no copper layer (comparative example 1) or to an similar reflector with no edge protection (comparative example 2). Some punctual defects may appear in examples 1 and 3 after a 20-days CASS test, and become unacceptable after a 30-days CASS test. After exposure to UV rays, polyurethanes may have the disadvantage, compared to silicones, that cracks may appear in the material. Therefore, it is to be expected that corrosion may increase drastically after a certain exposure time to UV rays. However, before the cracks completely cross the thickness of the edge protection, at least the edge protection would have played its role of protection against corrosion thereby lengthening the lifetime of the reflector.

Edge protection made of butyl or hot melt having unsuitable viscosity at application (temperature of material at application was too low) (comparative examples 3 and 4) already gave unacceptable edge corrosion values after 10 or 15 days (maxima at 1031 and 638 μm), whereas those materials are less permeable to water vapour. Comparative examples 5 and 6 show that there is no advantage in using the exuding out of bonding material to form the edge protection.

Examples 1 to 3 and comparative examples 1 to 4 were subjected to a thermal cycling test as hereinabove described during various periods. Results of these tests are presented in Table II. Resulting haze and adhesion properties are given as good (OK), acceptable (L meaning low haze) or unacceptable (KO). The advantage of the combination of an acrylic bonding material and a silicone or polyurethane edge protection is clearly visible in this table.

TABLE I

| | | | CASS test | | | | | | | | | | | | |
|---|---|---|---|---|---|---|---|---|---|---|---|---|---|---|---|
| | | | 5 days | | 10 days | | 15 days | | 20 days | | 25 days | | 30 days | | 35 days | |
| Example N° | bonding material | edge protection | average | max | average | max | average | max | average | max | average | max | average | max | average | max |
| 1 | acrylic transfer tape | Silicone DC 3362 | 10 | 31 | 28 | 77 | 29 | 44 | 43/58 | 94/94 | 58 | 106 | 68 | 163 | 81 | 213 |
| 2 | acrylic supported tape | Silicone DC 3362 | 0 | 0 | 0 | 0 | 0 | 0 | 21 | 46 | | | | | | |
| 3 | acrylic transfer tape | PU 442 | 10 | 10 | 20 | 44 | 22 | 30 | 50 | 263 | 34 | 181 | 45 | 231 | 51 | 238 |
| Comp. ex. 1 | not laminated | none | 140 | 154 | 190 | 231 | 240 | 309 | 290 | 386 | 340 | 464 | 390 | 541 | 440 | 619 |
| Comp. ex. 2 | acrylic transfer tape | none | 35 | 88 | 144 | 362 | | | | | | | | | | |
| Comp. ex. 3 | acrylic transfer tape | Butyl JS680 | <25 | 681 | 179 | 1031 | 222 | 1025 | 80/422 | 813/1056 | 284 | 1125 | 319 | 1140 | 439 | 1160 |
| Comp. ex. 4 | acrylic transfer tape | Hot melt | 50 | 97 | 72 | 163 | 180 | 638 | 412/58 | 1963/369 | 285 | 988 | 464 | 1106 | 570 | 1481 |
| Comp. ex. 5 | acrylic transfer tape | acrylic of the bonding material | 54-100 | 154 | 78-158 | 269 | 209 | 508 | | | | | | | | |
| Comp. ex. 6 | acrylic transfer tape | acrylic of the bonding material | 65 | 119 | 114 | 144 | 156 | 361 | | | | | | | | |

TABLE II

| | | | Thermal cycling (−20 to +75° C. - 4 times per day) | | | | | | | |
|---|---|---|---|---|---|---|---|---|---|---|
| | | | 42 days | | 85 days | | 126 days | | 168 days | |
| Example N° | bonding material | edge protection | Haze | adhesion | Haze | adhesion | Haze | adhesion | Haze | adhesion |
| 1 | acrylic transfer tape | Silicone DC 3362 | OK | OK | OK | OK | L | OK | L | OK |
| 2 | acrylic supported tape | Silicone DC 3362 | OK | OK | OK | OK | OK | OK | OK | OK |
| 3 | acrylic transfer tape | PU 442 | OK | OK | OK | OK | L | OK | KO | OK |
| Comp. ex. 1 | not laminated | none | OK | | KO | | | | | |
| Comp. ex. 2 | acrylic transfer tape | none | OK | OK | KO | OK | KO | OK | | |
| Comp. ex. 3 | acrylic transfer tape | Butyl JS680 | OK | OK | L | OK | KO | OK | KO | OK |
| Comp. ex. 4 | acrylic transfer tape | Hot melt | OK | OK | L | OK | KO | OK | KO | OK |

The invention claimed is:

1. A solar energy reflector comprising a mirror laminated to a supporting sheet with a bonding material,
wherein
the edges of the mirror are provided, at least on a portion forming a major part of their height and closest to the supporting sheet, with an edge protection made of a material comprising at least one of silicone, polyurethane and acrylic,
the material forming the edge protection is different from the bonding material,
the mirror comprises a glass substrate, a silver coating layer provided at a surface of the glass substrate and at least one paint layer covering the silver coating layer,
the total thickness of the mirror is greater than 0.9 mm, and
the mirror does not contain a layer of copper between the silver layer and the paint layer, and said mirror is attached to said supporting sheet through said bonding material, where said bonding material is in direct contact with the paint layer of said mirror and said bonding material is in direct contact with said supporting sheet, and wherein said bonding material is a laminate of a PET film with a layer of acrylic pressure sensitive adhesive directly attached to each side of said PET film.

2. A solar energy reflector according to claim 1, wherein the material forming the edge protection consists essentially of silicone.

3. A solar energy reflector according to claim 1, wherein the mirror is laminated to the supporting sheet so that the at least one paint layer is facing the supporting sheet.

4. A solar energy reflector according to claim 1, wherein the bonding material comprises an acrylic resin.

5. A solar energy reflector according to claim 4, wherein the bonding material comprises an acrylic pressure-sensitive adhesive.

6. A solar energy reflector according to claim 1, wherein the bonding material comprises at least one of an acetate-based polymer film, a PVB film, an ionomer-based film, and a TPU film.

7. A solar energy reflector according to claim 1, wherein the edges of the mirror are provided substantially on their total height with the edge protection.

8. A solar energy reflector comprising a mirror according to claim 1, wherein the reflector has an average edge corrosion of less than 50 μm after having been subjected to a 15 days CASS test.

9. A method for manufacturing a solar energy reflector according to claim 1, comprising:
laminating a mirror with no copper layer comprising a glass substrate, a silver coating layer provided at a surface of the glass substrate and at least one paint layer covering the silver coating layer to a supporting sheet by means of a bonding material
applying to the edges of the mirror, at least against the glass/silver and silver/paint interfaces, an edge protection made of a material which is different from the bonding material and which, at the time it is applied on the edges of the mirror, has a viscosity characterised by at least one of the following values:
extrusion rate greater than or equal to 50 g/min when measured according to method A as herein defined
extrusion rate greater than or equal to 5 g/min when measured according to method B as herein defined
viscosity less than or equal to 800 Pa·s when measured according to method C as herein defined
melt flow index greater than or equal to 30 ml/10 min when measured according to method D as herein defined
extrusion rate greater than or equal to 60 g/min when measured according to method E as herein defined.

10. A method according to claim 9, wherein the viscosity of the bonding material, at the time it is applied on the edges of the mirror, is characterised by at least one of the following values:
extrusion rate greater than or equal to 100 g/min when measured according to method A as herein defined
extrusion rate greater than or equal to 10 g/min when measured according to method B as herein defined
viscosity less than or equal to 700 Pa·s when measured according to method C as herein defined
melt flow index greater than or equal to 50 ml/10 min when measured according to method D as herein defined
extrusion rate greater than or equal to 180 g/min when measured according to method E as herein defined.

11. A method according to claim 9 or claim 10, wherein the edge protection is applied to the edges of the mirror on at least a portion forming the major part of their height.

12. A method according to claim 9, wherein the edge protection is applied by extrusion.

13. A solar energy reflector according to claim 1, wherein the thickness of the mirror is greater than 0.9 mm to less than 2 mm.

14. A solar energy reflector according to claim 1, wherein the mirror comprises a glass substrate, a silver coating layer present on and in contact with a surface of the glass substrate, and at least one paint layer present on and in contact with the silver coating layer.

15. A solar energy reflector according to claim 1, wherein the bonding material and the paint are distinct layers in the solar energy reflector.

* * * * *